United States Patent
Duan (10) Patent No.: US 10,738,594 B2
(45) Date of Patent: Aug. 11, 2020

(54) APPLICATION OF THE TIME DERIVATIVE OF DISTRIBUTED TEMPERATURE SURVEY (DTS) IN IDENTIFYING FLOWS IN AND AROUND A WELLBORE DURING AND AFTER HYDRAULIC FRACTURE

(71) Applicant: Halliburton Energy Services, Inc., Houston, TX (US)

(72) Inventor: Hongyan Duan, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 225 days.

(21) Appl. No.: 15/568,277

(22) PCT Filed: Jun. 15, 2015

(86) PCT No.: PCT/US2015/035867
§ 371 (c)(1),
(2) Date: Oct. 20, 2017

(87) PCT Pub. No.: WO2016/204724
PCT Pub. Date: Dec. 22, 2016

(65) Prior Publication Data
US 2018/0112520 A1  Apr. 26, 2018

(51) Int. Cl.
*E21B 47/06* (2012.01)
*E21B 43/26* (2006.01)
(Continued)

(52) U.S. Cl.
CPC ........... *E21B 47/065* (2013.01); *E21B 43/26* (2013.01); *E21B 47/1005* (2013.01);
(Continued)

(58) Field of Classification Search
CPC ................ E21B 47/065; E21B 43/26
(Continued)

(56) References Cited

U.S. PATENT DOCUMENTS

2012/0139746 A1* 6/2012 Chen ................. G01V 3/38
340/853.2
2015/0114628 A1* 4/2015 Chen ................. G01V 9/005
166/250.01
(Continued)

OTHER PUBLICATIONS

"International Application Serial No. PCT/US2015/035867, International Search Report dated Mar. 15, 2016".
(Continued)

*Primary Examiner* — Ricky Ngon
(74) *Attorney, Agent, or Firm* — Gilliam IP PLLC (57) ABSTRACT

A method for using the time derivative of distributed temperature sensing (DTS) data obtained during hydraulic fracturing to identify fluid activities not as evident in conventional DTS date inside or near the wellbore during the hydraulic fracturing process comprises providing a fiber optic based distributed temperature sensing measurement system through a production region; gathering the temperatures through the production region as a function of the depth in the subsurface well and as a function of the elapsed time; calculating from the gathered data the time derivative of the temperature changes as a function of depth in the subsurface well and of the elapsed time; and displaying the time derivative data for analysis of the fluid activities inside or near the wellbore during the hydraulic fracturing process to identify fluid activities inside or near the wellbore.

14 Claims, 6 Drawing Sheets

(51) Int. Cl.
E21B 47/10 (2012.01)
E21B 47/12 (2012.01)
G01K 11/32 (2006.01)

(52) U.S. Cl.
CPC ............ *E21B 47/123* (2013.01); *G01K 11/32* (2013.01); *G01K 2011/324* (2013.01)

(58) Field of Classification Search
USPC ............................................................ 702/3
See application file for complete search history.

(56) References Cited

U.S. PATENT DOCUMENTS

| | | | |
|---|---|---|---|
| 2015/0114631 A1* | 4/2015 | Chen ..................... | E21B 47/065 166/250.15 |
| 2015/0120194 A1* | 4/2015 | Chen ..................... | E21B 47/00 702/6 |
| 2015/0177042 A1* | 6/2015 | Song ..................... | G01F 1/74 73/861.04 |
| 2017/0370215 A1* | 12/2017 | Hsu ..................... | E21B 49/082 |

OTHER PUBLICATIONS

"International Application Serial No. PCT/US2015/035867, Written Opinion dated Mar. 15, 2016".
CA Application Serial No. 2,980,862, Examiner's Letter, dated Jul. 20, 2018, 4 pages.
CA Application Serial No. 2,980,862, Office Action, dated Jun. 20, 2019, 4 pages.

* cited by examiner

```
┌─────────────────────────────────────────────────────────────────────┐
│ Collect DTS temperature data from Hydraulic fracturing or injection │
│ jobs into a matrix with dimension of [mxn].                         │
│                                                                     │
│ m is number of samples in depth and n is number of samples in time  │
│ scale                                                          110  │
└─────────────────────────────────────────────────────────────────────┘
                                  ▼
┌─────────────────────────────────────────────────────────────────────┐
│ For each row of the DTS matrix, apply derivative of temperature     │
│ corresponding to time.                                              │
│                                                                     │
│ The result of the time derivative is restored in a new matrix with  │
│ dimension of [m x n-2]. The first and last column of the DTS matrix │
│ can not be applied with time derivative.                       120  │
└─────────────────────────────────────────────────────────────────────┘
                                  ▼
┌─────────────────────────────────────────────────────────────────────┐
│ Plot new derivative matrix in MatLab or other viewing software with │
│ horizontal axis as time, vertical axis as depth and color coded as  │
│ value of temperature derivative.                               130  │
└─────────────────────────────────────────────────────────────────────┘
                                  ▼
┌─────────────────────────────────────────────────────────────────────┐
│ Adjust color scheme of the derivative plot between [-a ,a]. Distinct│
│ marks or boundaries stand out from plot due to its large positive or│
│ large negative value, which indicate a fluid movement near wellbore.│
│ Rest of the image shows a neutral color due to their near-zero value.│
│                                                                     │
│ a is a temperature gradient value ranging from 0.01 ~0.1       140  │
└─────────────────────────────────────────────────────────────────────┘
                                  ▼
┌─────────────────────────────────────────────────────────────────────┐
│ By comparing with injection time and well installation diagram, one │
│ can identify not only when and where the fluid movement occurs along│
│ wellbore but also in what direction and what causes the fluid flow. │
│                                                                150  │
└─────────────────────────────────────────────────────────────────────┘
```

APPLICATION OF THE TIME DERIVATIVE OF DISTRIBUTED TEMPERATURE SURVEY (DTS) IN IDENTIFYING FLOWS IN AND AROUND A WELLBORE DURING AND AFTER HYDRAULIC FRACTURE

BACKGROUND

This disclosure relates generally to temperature sensing, and more particularly, to the use of new methodologies for interpreting distributed temperature sensing information.

Fiber optic Distributed Temperature Sensing (DTS) systems were developed in the 1980s to replace thermocouple and thermistor based temperature measurement systems. DTS technology is often based on Optical Time-Domain Reflectometry (OTDR) and utilizes techniques originally derived from telecommunications cable testing. Today DTS provides a cost-effective way of obtaining hundreds, or even thousands, of highly accurate, high-resolution temperature measurements, DTS systems today find widespread acceptance in industries such as oil and gas, electrical power, and process control.

DTS technology has been applied in numerous applications in oil and gas exploration, for example hydraulic fracturing, production, and cementing among others. The collected data demonstrates the temperature profiles as a function of depth and of time during a downhole sequence. The quality of the data is critical for interpreting various fluid movements.

The underlying principle involved in DTS-based measurements is the detection of spontaneous Raman back-scattering. A DTS system launches a primary laser pulse that gives rise to two back-scattered spectral components. A Stokes component that has a lower frequency and higher wavelength content than the launched laser pulse, and an anti-Stokes component that has a higher frequency and lower wavelength than the launched laser pulse. The anti-Stokes signal is usually an order of magnitude weaker than the Stokes signal (at room temperature) and it is temperature sensitive, whereas the Stokes signal is almost entirely temperature independent. Thus, the ratio of these two signals can be used to determine the temperature of the optical fiber at a particular point. The time of flight between the launch of the primary laser pulse and the detection of the back-scattered signal may be used to calculate the spatial location of the scattering event within the fiber.

DTS technology has been applied to production monitoring for identifying gas/oil entry depths along the wellbore. It is especially meaningful for open hole completion. Oil and gas is usually at geothermal temperatures. But it changes temperature as it approaches the wellbore due to pressure drop. This effect is usually called the 'Joule Thompson' effect. At steady state, a wellbore stays near geothermal temperatures except those depths, where oil and gas enters. DTS is used to try to find those depths that have different temperature from others.

Two methods are widely applied in industry to investigate these phenomena. DTS single trace analysis and DTS time-depth 2D image analysis. The first one is usually operated by including a limited amount of DTS curves in Depth-Temperature plot to find those noticeable local minimum temperatures on each single trace. The second method is to the DTS data in Time-Depth 2D plot. There is a need for better tools to address these phenomena.

DETAILED DESCRIPTION

In the following detailed description, reference is made to accompanying drawings that illustrate embodiments of the present disclosure. These embodiments are described in sufficient detail to enable a person of ordinary skill in the art to practice the disclosure without undue experimentation. It should be understood, however, that the embodiments and examples described herein are given by way of illustration only, and not by way of limitation. Various substitutions, modifications, additions, and rearrangements may be made without departing from the spirit of the present disclosure. Therefore, the description that follows is not to be taken in a limited sense, and the scope of the present disclosure will be defined only by the final claims.

Two methods are widely applied in industry to review DTS data and to identify locations of thermal events, DTS single trace analysis and DTS time-depth 2D image analysis. The first one is usually operated by including and viewing a limited amount of DTS curves in a Depth-Temperature plot to find those noticeable local minimum temperatures on each single trace. The second method is to display the DTS data in Time-Depth 2D plot. Both of these methods are manual and qualitative, and may be followed by additional modeling, like e.g. thermal mass balance models to convert thermal events into e.g. quantitative flow information.

DTS technology has been applied to production monitoring for identifying gas/oil entry depths along the wellbore. It is especially meaningful for open hole completions. Fluids and gases in down-hole reservoirs are at geothermal temperatures, and the geothermal temperature depends on depth and formation characteristics. Fluids and gases may change temperature while migrating through the reservoir to the wellbore due to e.g. friction and pressure drop. The pressure drop induced temperature effect is called 'Joule Thompson' effect. At steady state production, the wellbore stays at geothermal temperature or slowly warms towards geothermal temperature after disturbances except at those depths where oil and gas enters and temperature events may occur due to Joule-Thompson heating or cooling. DTS is used to find those locations that have different temperature behavior from other locations along the wellbore that are at geothermal temperature. The challenge with DTS trace analysis and time-depth DTS plots is that many of the temperature events that are indicative of flow events may be very small in magnitude, and difficult to find. A skilled data analyst would need to change the temperature scale numerous times while sifting through the data to identify the temperature events that would indicate flow events. This is both time consuming and requires experience, and there is an obvious need for improved tools and methods to make DTS data interpretation more efficient and accurate.

A tool and a method will be shown where this need is met. The time derivative of DTS data is a tool that is able to detect subtle changes in DTS data, while reducing the manual input required by an expert. The tool and method can reduce large amounts of DTS traces into a matrix of data, i.e. a derivative plot, where automatic post processing may save a significant amount of time on color adjusting and highly reduce the error. Since the tool and method is irrelevant to the absolute value of temperature, one matrix of data can be used to produce a set of plots with different sensitivities. The minimum and maximum for a derivative plot, usually between −0.3 (Degrees F./Foot) to +0.3 (Degrees F./Foot), can be used for most of the production cases regardless of formation properties or the measured depth of the wells. Multiple plots can also be automatically generated as desired with different minimum and maximum gradient values as desired to allow the data analyst to select the optimum scale with minimum manual input. The method can capture a small change of the temperature despite its absolute value. And only the change that is persistent during a period of time can form a clear streak on the image, e.g. Joule-Thompson induced cooling of the formation at a fluid flow location.

It will be shown that the time derivative of DTS can be a tool that is able to identify the reservoir fluid flow near the wellbore accurately in both depth and time. The time derivative of DTS is created by subtracting the temperature at one time step from the one at the next time step. The difference is then divided by the time elapsed. This methodology will be explained later in a discussion of FIG. 5. Time derivative of DTS plots the temperature change in time and presented in the time-depth domain. It captures the small changes despite the absolute value of the temperature.

In such a time derivative presentation three clear events can be directly observed, injection cooling in the casing and near wellbore, geothermal recovery of the stagnant fluid and formation near wellbore, and the fluid flow from reservoir back to the wellbore. The last two events usually occur at the same time and show a very similar signs in DTS plot.

It should be noted before proceeding to an analysis of the figures in this disclosure that a preferred method of presentation in a hydraulic fracturing analysis to be shown is the use of color displays. Because color is not allowed in most patent applications the figures contained herein will be presented in a pure black and white. It will be seen however that the value of this approach will be evident even in black and white.

Figure 1:
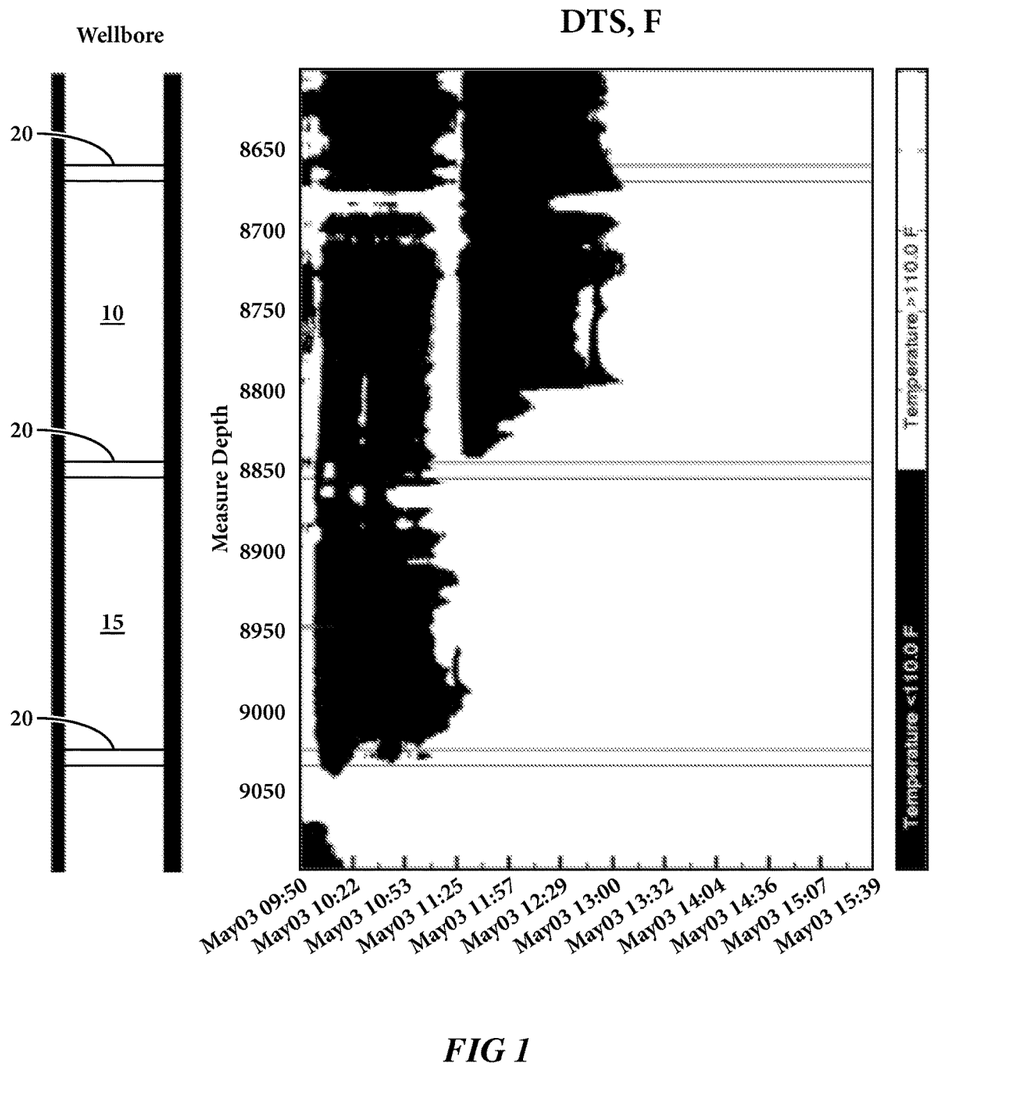
FIG. 1 illustrates a DTS plot in the time and depth scale for a two stage open hole fracturing example.
Figure 2:
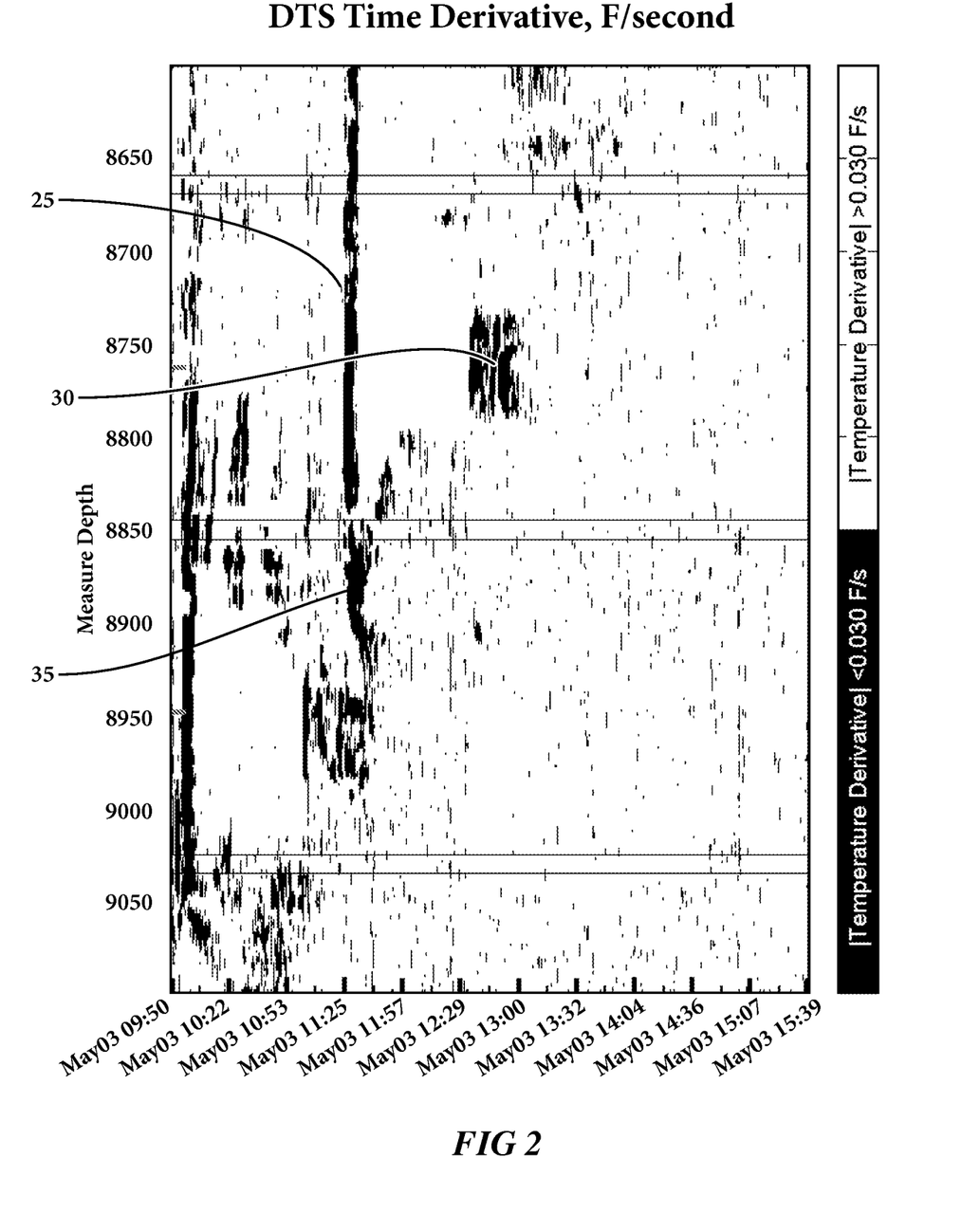
FIG. 2 illustrates a time derivative of DTS plot in depth and time scale of the same example and data as FIG. 1.

FIGS. 1 and 2 exhibit actual data showing two stages 10,15 in a hydraulic fracturing example. Each stage has swell packers 20 installed in the annulus with a sliding sleeve opened on the casing. Fiber is installed outside the casing (not shown). Three types of thermal events can be seen, but much more clearly in the derivative plot of FIG. 2 than the conventional DTS data of FIG. 1. At each stage, the temperature increases gradually based on the background geothermal temperatures after the end of the stage, which in a color display is shown as a green/yellow background color. Clearly shown in the derivative plot of FIG. 2 is a vertical line 25 early in the stage caused by injection fluid cooling the casing. This is a blue color in a color display. Strong signals in the derivative plot 30,35 indicate reservoir flow back (a dark red signal) at certain depths of the stage. The derivative plot works as a filter that only discovers the fluid flow that occurs inside or near the wellbore. In this example, the reservoir responds by flowing a warm fluid back the wellbore at end of the stage. The resulting small temperature change can only be identified in the derivative plot.

The DTS plot in FIG. 1 show thermal changes over time, but requires a skilled analyst and a lot of work to differentiate between general warm-back of the well bore and subtle thermal changes due to small flow events. DTS data interpretation is labor intensive and is viewed as an art where a skilled data analyst sifts through data to detect thermal events.

Figure 3:
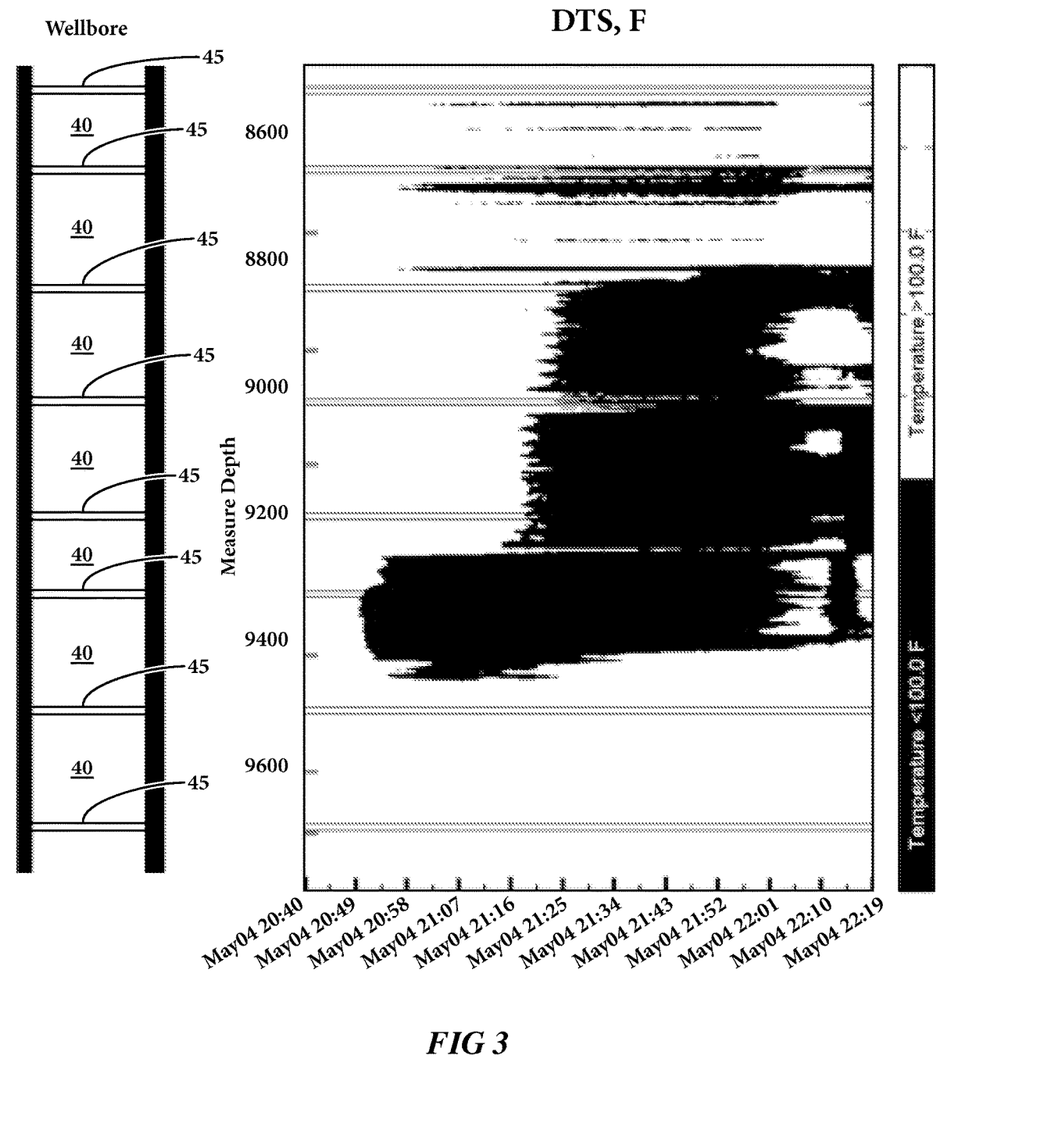
FIG. 3 illustrates a DTS plot in the time and depth scale for a multi-stage open hole fracturing example.
Figure 4:
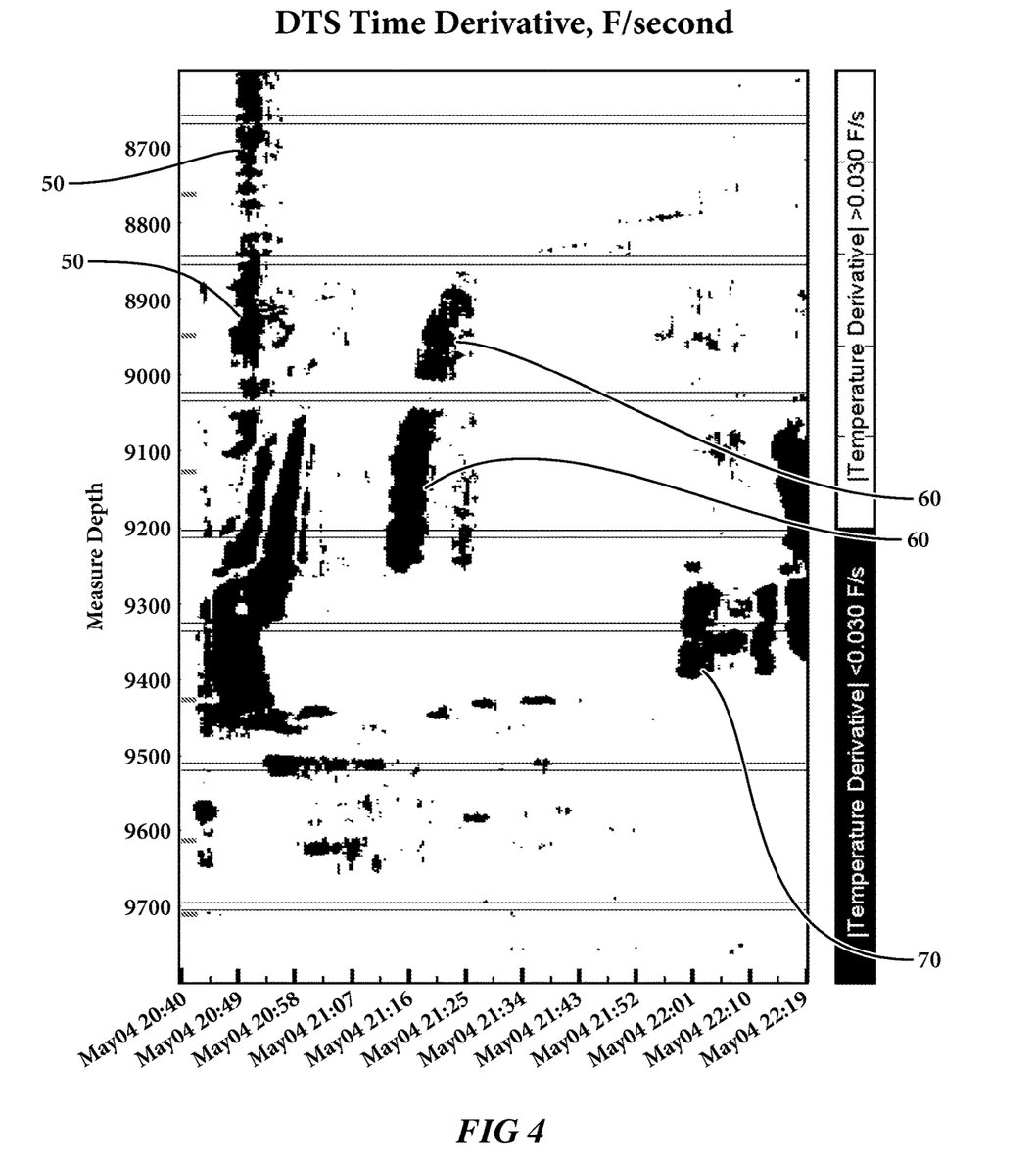
FIG. 4 illustrates a time derivative of DTS trace in the depth and time scale for the same example and data as FIG. 3.

A second example is shown the combination of FIGS. 3 and 4, both using the same data. In this example there are multiple fracturing stages 40, each separated by swell packers 45. Injection fluid cooling 50 the casing again shows clearly in the derivative plot of FIG. 4, and is not evident in FIG. 3. Fluid invading from the reservoir 60 is quite evident in FIG. 4 (shown in blue in color), and is not as clearly seen in FIG. 3. And finally, near the end of the fracturing stage, a reservoir response 70 can be clearly seen. In each of these can be seen evidence of reservoir fluid invading into adjacent zones during fracturing.

During the fracturing, pressure is largely altered in the near wellbore formation. Zones appear where pressure is different from one to another in geometry. On the other hand, created fracture and injected proppants can also change this pressure variation in time scale. Especially at end of the stage, injection rate is suddenly dropped, bringing the altered pressure zones near the wellbore, creating complicated flow zones. Fluid injected into the formation can flow back to the wellbore. The temperature difference between the flow back and the wellbore fluid is usually very small due to its short time staying in the reservoir. Therefore it is not clear from the DTS plot whether the temperature increase is due to the flow back or due to the geothermal heating.

The time derivative of DTS plots are able to capture small changes despite the absolute value of the temperature. Only the thermal change caused by fluid flow convection shows a distinct value on the time derivative map, while the conduction induced by geothermal is mutualized as background color. In the derivative plot, fluid flow near wellbore, such as a reservoir fluid flow back is thus separated from the geothermal recovery temperature changes.

This new methodology provides a conclusive tool that is able to show the communication between fracture stages. It offers us much more information than from DTS data alone to evaluate and re-plan the fracture and predict the production of the well.

Generation of Derivative DTS Data

The disclosure herein anticipates any mathematically correct manner of generating the derivative data. The example embodiment for calculating the depth derivative is explained as follows.

Derivative data from DTS data can be generated by feeding the numerical data of temperature as a function of depth and time into a matrix and then computationally moving through all of the matrix data points to calculate derivative values for each matrix element. This can be done as either depth derivatives or as time derivatives. These derivative values can then be presented as a matrix of numbers, or, more usefully can be presented as color images in which the various colors represent different values of the derivatives. As discussed earlier, they are presented herein as gray scale images which show important features that are not evident in the presentation of the conventional DTS data alone.

Time Derivative of DTS:

In this example the computation language MatLab is used to compute regular DTS data into a time derivative of DTS. And the result is also plotted by MatLab in a depth-time scale.

For the DTS measurement, Temperature is function of depth and time:

$$T = T(\text{depth}, \text{time}) \qquad (3)$$

Data is loaded into MatLab and stored as a matrix. See the first matrix of FIG. 3.

The time derivative of DTS, also called DTS time gradient, is computed as:

$$T'(d,t) = (T(d, t+\Delta t) - T(d, t-\Delta t))/(2 * \Delta t) \qquad (4)$$

The time derivative at any depth and time step is calculated by subtracting the temperature at its previous time step from the one at its next time step and result is divided by the time interval between these two steps.

The structure of the derivative matrix is shown as the second matrix in FIG. 4:

Both DTS and DTS derivative matrix can be plotted as a depth-time 2D color map by MatLab function pcolor(d,t,T) or pcolor(d,t,T'). Input parameters d and t are depth and time vectors. Input T or T' is a 2D matrix with number of rows as d and number of columns as t.

Figure 5:
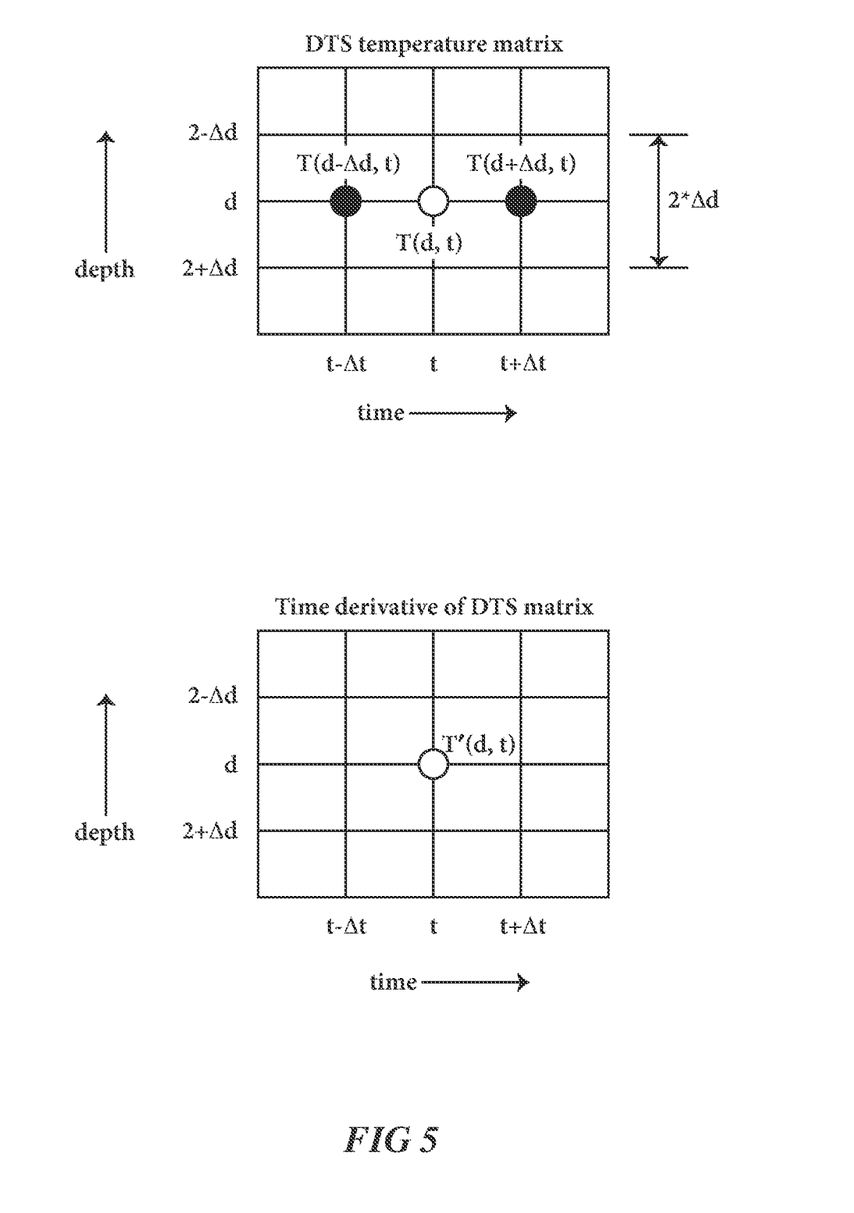
FIG. 5 illustrates the data matrices representing the DTS data for representing the time derivative displays of FIGS. 2 and 4.
Figure 6:
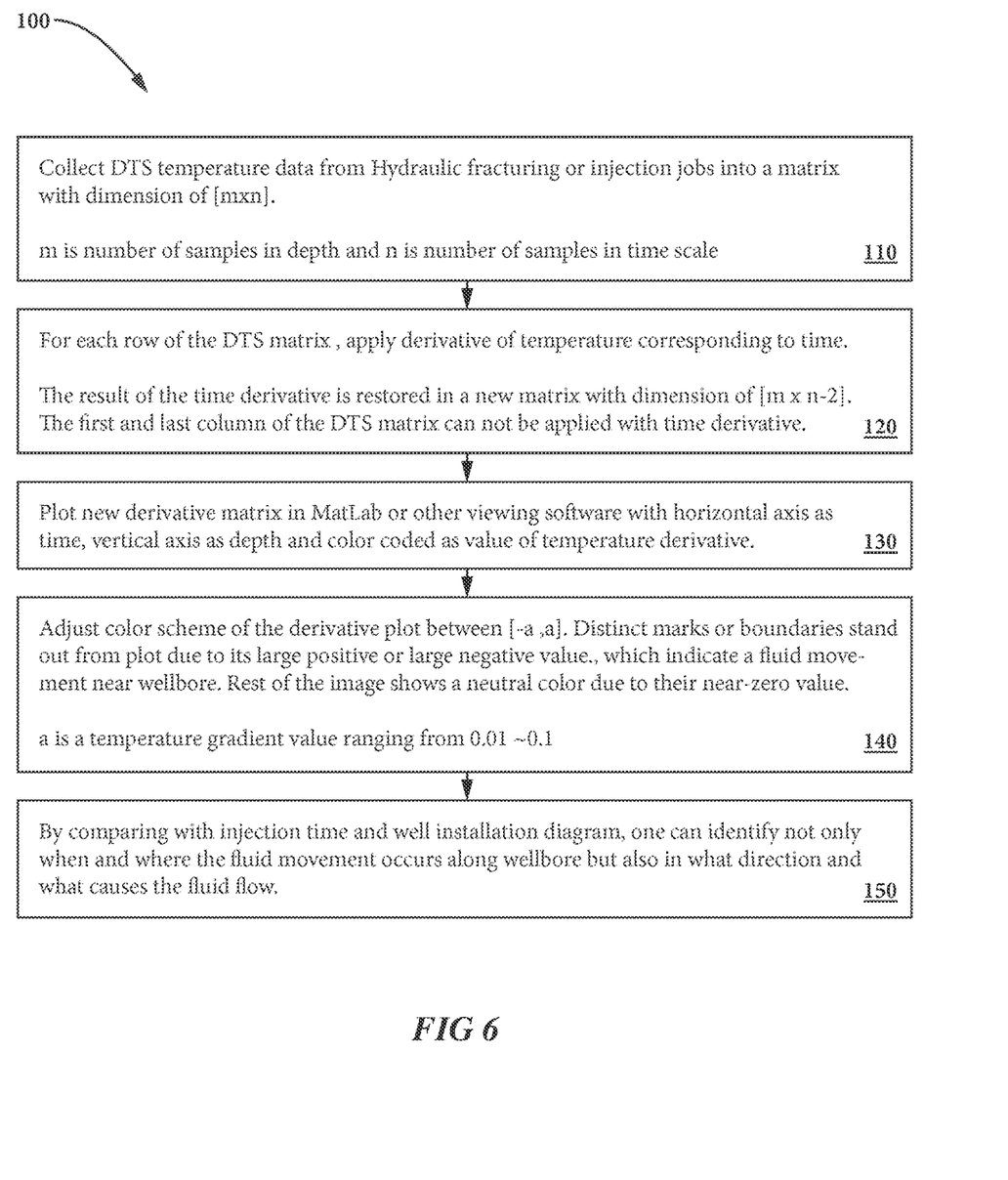
FIG. 6 illustrates a work flow for generating the data analysis for the identification.

The method can be described alternately with the process 100 as in FIG. 6. In the first step 110 a DTS system is used to collect temperature data from hydraulic fracturing or injection jobs into a matrix of dimensions [m×n], where m is the number of samples taken in the depth scale and n is the number of samples taken in time scale. In the step 120 for each row of the DTS matrix, the derivative of temperature corresponding to time is calculated. The result of this derivative is stored in a new matrix with dimension [m×n−2]. The first and last column of the DTS matrix cannot be applied with the time derivative. The developing time derivative matrix is shown in FIG. 5. In the step 130 any viewing software such as MatLab can be used to plot the derivative matrix with time as the horizontal axis and depth as the vertical axis. If color display is operable the color can be coded as a value of temperature derivative. The user can then adjust (step 140) the color scheme of the derivative plot until one distinct marks or boundaries stand out from the plot due to large positive or large negative values, which indicate a fluid movement near a wellbore. And in step 150, by examining the injection times with the well installation diagram, when and where fluid movement occurs can be identified and also in what direction and what causes the fluid flow.

By default, MatLab uses a Blue-Red color scheme that represents the value of the temperature or value of the derivative. In the DTS plot, blue represents a low temperature while red represents a high temperature. In DTS time derivative (DTS time gradient) plot, blue represents a temperature decrease along the time. Red represents a temperature increase along the time. A large value in red (darker) zone indicates a large temperature increase per second. Large negative value in blue zone indicates a large temperature drop per second. Again because color cannot be used in patent applications these are presented as black/white scale images which still show the new possibilities of data presentation possible by the use of displayed color data.

The resulting time derivative temperature data as a function of depth and time can be presented in a number of ways. In one example the actual numerical values can be stored for later retrieval and then either displayed on a monitor or printed for study. In another example the resulting time derivative of temperature can be displayed as different colors on a color display for better understanding and interpretation. In yet another example that same data can be displayed in black/white scale as shown in the Figures supplied herein. The same data can also be displayed in gray scale.

Although certain embodiments and their advantages have been described herein in detail, it should be understood that various changes, substitutions and alterations could be made without departing from the coverage as defined by the appended claims. Moreover, the potential applications of the disclosed techniques is not intended to be limited to the particular embodiments of the processes, machines, manufactures, means, methods and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized. Accordingly, the appended claims are intended to include within their scope such processes, machines, manufactures, means, methods or steps.

The invention claimed is:

1. A method comprising:
    obtaining temperature measurements over time, wherein the temperature measurements comprise temperatures measured by a distributed temperature sensing (DTS) system at different depths of a subsurface wellbore over the time;
    assembling the temperature measurements into a matrix, wherein the matrix has dimensions based on a number of samples collected in a depth scale and in a time scale;
    calculating from the matrix time derivatives of the temperature measurements at each depth; and
    displaying the time derivatives and boundaries among the time derivatives to identify fluid activities inside or near the wellbore, wherein displaying the time derivatives and boundaries among the time derivative is achieved at least in part by adjusting the color scheme of the time derivatives until one or more distinct marks or boundaries stand out based on differences in values of the time derivatives.

2. The method of claim 1 wherein numerical values of the time derivatives are recorded and printed or displayed.

3. The method of claim 1 wherein the time derivatives are displayed in colors that correspond to magnitudes of the time derivatives.

4. The method of claim 1 further comprising determining a direction and identity of a source of the fluid activity based on the boundaries.

5. A method for using time derivatives of distributed temperature sensing (DTS) data obtained during hydraulic fracturing to identify fluid activities inside or near a wellbore during a hydraulic fracturing process comprising:
    gathering temperature data through a production region at different depths in a subsurface well over an elapsed time;
    calculating from the gathered temperature data time derivatives of the temperature data;
    assembling the data into a DTS matrix of wherein m is a number of samples collected in a depth scale and n is the number of samples collected in a time scale;
    for each row of the DTS matrix, calculating a time derivative of the temperature data to determine rate of change of a temperature measurement with respect to time at the depth corresponding to the row and storing the calculated time derivative of temperature in a new matrix with dimensions; and displaying the new matrix in a plot with one axis as time and another axis as depth and color coding indications of time derivatives based on magnitudes of the time derivatives.

6. The method of claim 5 wherein the time derivative indications are displayed as a function of depth and time on a display monitor.

7. The method of claim 5 wherein the time derivative indications are displayed in black/white as a function of depth and time on a display monitor.

8. The method of claim 5 wherein numerical values of the time derivatives are recorded and printed or displayed.

9. The of claim 5 wherein the time derivative indications are displayed in gray scale as a function of depth and time on a display monitor.

10. A system comprising:
a processor; and
a machine-readable medium having program code executable by the processor to cause the system to,
assemble temperature measurements obtained by the system over time at each of different depths of a wellbore into a matrix;
calculate with the matrix time derivatives of the temperature measurements at each depth; and
color code display of the time derivatives to indicate fluid activities inside or near the wellbore, wherein the program code to color code display of the time derivatives comprises the program code executable by the processor to cause the system to color code display of the time derivatives based, at least in part, on magnitudes of the time derivatives.

11. The system of claim 10 wherein the machine-readable medium further has program code executable by the processor to cause the system to record, print or display numerical values of the time derivatives.

12. The system of claim 10 wherein the program code to color code display of the time derivatives comprises the program code executable by the processor to cause the system to color code display of the time derivatives as a function of depth and time on a display monitor.

13. The system of claim 10 wherein the program code to color code display of the time derivatives further comprises program code executable by the processor to cause the system to adjust the color scheme of the display of the time derivatives until one or more distinct marks or boundaries stand out based on differences in values of the time derivatives.

14. The system of claim 10 wherein the machine-readable medium having program code executable by the processor includes program code to determine a direction and identity of a source of the fluid activity based on the display of the time derivatives.

* * * * *

UNITED STATES PATENT AND TRADEMARK OFFICE
CERTIFICATE OF CORRECTION

PATENT NO. : 10,738,594 B2
APPLICATION NO. : 15/568277
DATED : August 11, 2020
INVENTOR(S) : Hongyan Duan Page 1 of 1

It is certified that error appears in the above-identified patent and that said Letters Patent is hereby corrected as shown below:

In the Claims

Column 7, Line 13, please replace the portion reading "The of claim 5" with --The method of claim 5--

Signed and Sealed this
Sixth Day of October, 2020

Andrei Iancu
*Director of the United States Patent and Trademark Office*